United States Patent [19]
Simond

[11] Patent Number: 5,187,844
[45] Date of Patent: Feb. 23, 1993

[54] SELF-LOCKING SNAP-HOOK

[75] Inventor: Ludger Simond, Les Bossons, France

[73] Assignee: Etablissements Ludger Simond, Société Anonyme, Chamonix Mont Blanc, France

[21] Appl. No.: 714,614

[22] Filed: Jun. 13, 1991

[30] Foreign Application Priority Data

Jun. 20, 1990 [FR] France ............................ 90 07898

[51] Int. Cl.⁵ .......................................... A44B 13/02
[52] U.S. Cl. .................................. 24/599.5; 24/302; 24/600.2; 24/600.3
[58] Field of Search .................. 24/598.2, 573.5, 599.1, 24/599.4, 599.5, 599.6, 599.7, 599.8, 600.2, 601.5, 298, 600.3, 302

[56] References Cited

U.S. PATENT DOCUMENTS

| 271,713 | 2/1883 | Jones .......................... 24/598.2 X |
| 1,724,003 | 8/1929 | Chamberlain . | |
| 4,819,304 | 4/1989 | Engers .......................... 24/573.5 X |
| 5,005,266 | 4/1991 | Fister et al. .................... 24/601.5 |

FOREIGN PATENT DOCUMENTS

| 413694 | 1/1924 | Fed. Rep. of Germany . | |
| 2536204 | 2/1977 | Fed. Rep. of Germany ..... 24/573.5 |
| 3516049 | 11/1986 | Fed. Rep. of Germany . | |
| 344921 | 11/1904 | France . | |
| 602113 | 2/1960 | Italy ................................ 24/573.5 |

Primary Examiner—James R. Brittain
Attorney, Agent, or Firm—William H. Eilberg

[57] ABSTRACT

A self-locking snap-hook is disclosed which is so shaped that the tractive load transmitted by a first traction element is applied to a first tractive force application end formed by the snap-hook body, and the tractive load transmitted by the second traction element is applied to the locking finger. Thus, the application of the tractive load tends to close the snap-hook and cause self-locking thereof.

7 Claims, 9 Drawing Sheets

SELF-LOCKING SNAP-HOOK

BACKGROUND OF THE INVENTION

The present invention relates to quick coupling connection devices, more commonly called snap-hooks or snap-rings.

Snap-hooks, which are widely used in industry and for practising mountain climbing, speleology and nautical sports, generally comprise a C shaped body, defining a general flat open ring both ends of which opposite each other define an opening which can be closed by a pivoting finger. The finger is pivoted at its first end on the first end of the body by means of a transverse pivot pin. The second end of the finger, in the closed position of the snap-hook, bears against the second end of the body, the finger being able to be pushed back by the user, by pivoting inside the ring to an open position.

Known snap-hooks form an oblong ring, in which two longitudinal legs may be distinguished disposed along the length of the ring and connected together by two transverse legs forming the ends of the ring. The snap-hook body forms one of the two longitudinal legs and the two transverse legs. The closure finger forms a portion of the second longitudinal leg. This elongate ring shaped structure, in which the body forms the two ends of the ring, means that the snap-hook body withstands the major part of the tractive forces to which the snap-hook is subjected. In fact, in normal use, the snap-hook connects together two tractive elements, for example a first element formed of a piton anchored in a rock and a second element formed of a rope sliding in the snap-hook. At the time of a tractive force, the snap-hook is oriented so that the first element comes into the curvature forming the first end of the snap-hook and the second element comes into the curvature forming the second end of the snap-hook. Both of the traction elements then bear on the inner face of the snap-hook ends, i.e. on the body itself, which then absorbs the greatest part of the tractive forces.

A first problem is due to the fact that, in ordinary snap-hooks, the closure finger is returned to the closed position by a return spring. The return spring is the only element causing closure of the finger, and holding the finger in a closed position. The result is that, under certain conditions of use, some mechanical forces may cause the finger to open. When the finger is open:

the traction elements may escape from the snap-hook, which is then no longer capable of fulfilling its connection function, the snap-hook becomes less resistant, since the open finger no longer participates in the mechanical resistance, and it may be deformed or even broken more easily.

It has been proposed, to solve this problem, to provide locking means which prevent the finger from pivoting towards its open position. But such locking means require additional handling during opening and/or closing of the snap-hook. This means that such conventional locking snap-hooks are not adapted for example to extreme conditions of use, such as scaling a cliff, since handling thereof requires the use of both hands.

Thus, the problem raised by the present invention is to design a snap-hook in which the application of the tractive load automatically and by itself ensures locking of the closure finger and holds it in a closed position. Thus a self-locking snap-hook is provided.

The advantage thus obtained is that such a snap-hook may be used without requiring the simultaneous use of both hands for opening and/or closing it, while presenting the required conditions of reliability sufficient for preventing the finger from opening under all conditions of use.

In particular, locking is provided, when climbing a cliff face, for example at the time of a fall despite the vibrations which may appear during such use.

According to another aspect of the present invention, the snap-hook may be provided with means for holding the finger in the open position, and causing its automatic return to the closed position as soon as a tractive load is applied to the snap-hook. That considerably facilitates use of the snap-hook, for example in the case when the user must very quickly fit the rope in the snap-hook or wishes to anchor himself to an anchorage element located in a relatively distant position, requiring reaching it with outstretched arm; it is then sufficient to pass the free end of the snap-hook body in an opening provided in the anchorage element, and a simple tractive force on the rope or on the snap-hook causes its closure and locking thereof.

According to another advantageous possibility, attempts have also been made to facilitate opening of the snap-hook in the absence of a load, in order to improve the voluntary unhooking possibilities. Thus, a self-locking snap-hook is provided with assisted opening.

While searching for the ease of closure and/or opening, as mentioned above, the present invention has the further object of designing such a snap-hook allying a great mechanical strength under tractive forces with a great possibility of opening.

SUMMARY OF THE INVENTION

To attain these objects and others, the snap-hook according to the present invention comprises:

a body in the form of a rod curved between a first pivot end and a second free coupling end;

a closure finger, whose first end is pivoted on the first pivot end of the body by a transverse pin and whose second end comes opposite the second free coupling end of the body;

the finger may be pivoted about its pivot pin between an open position, in which its second end is spaced away from the second free coupling end of the body towards the inside of the ring, and a closed position in which its second end is in contact with the second free coupling end of the body so as to form a closed ring;

the second end of the finger and the second free coupling end of the body comprise interlocking shapes fitting one into the other so that, in the closed position, the interlocking shapes prevent the finger from pivoting outwards of the ring and prevent the second respective ends of the finger and of the body from moving relatively axially away from each other;

the snap-hook comprises load guidance means so that the tractive load transmitted by the first element is applied on an intermediate zone of the body whereas the tractive load transmitted by the second element is applied to an intermediate zone of the finger, the tractive force between the first element and the second element taking place in a favored traction direction passing through the plane of the ring between the pivoting zone and the coupling zone of the finger and the body.

With such a structure, the application of the tractive load tends to bring the body and the finger into their respective closed positions.

In one embodiment, the load guidance means comprise:

the fact that the snap-hook has a general shape of a ring elongate in a favored traction direction passing through two opposite ends, said opposite ends forming tractive force application ends;

the fact that the snap-hook body comprises said first tractive force application end;

the fact that the snap-hook finger comprises said second tractive force application end, so that, during application of a tractive force between a first traction element and a second traction element, the snap-hook tends naturally to be oriented so that its largest dimension is substantially parallel to the direction of the tractive force, the first traction element being coupled to the body, the second traction element being coupled to the finger.

Preferably, the load guidance means comprise an aperture or notch formed in the finger in an intermediate position and shaped so that the second traction element passes therethrough, thus fixing the point of application of the tractive force of the second element on the snap-hook.

In an advantageous embodiment, the snap-hook further comprises locking means, for example locking levers or a ring mounted for sliding or pivoting on a rectilinear portion of the snap-hook, and returned by a spring towards a locked position in which they immobilize two respective body and finger ends, with respect to each other in the closed position, so as to prevent the finger from pivoting towards its open position.

According to the present invention, the snap-hook may further comprise a return spring urging the finger in rotation on the body towards its open position,, contrary to the action of the springs usually provided on known snap-hooks, whose presence tends to close the finger.

BRIEF DESCRIPTION OF THE DRAWINGS

Other objects, features and advantages of the present invention will be clear from the following description of particular embodiments, with reference to the accompanying figures in which.

DESCRIPTION OF THE PREFERRED EMBODIMENTS

As shown in the figures, snap-hook 1 according to the present invention has the general form of a closed ring and is intended to transmit a tractive load between a first traction element 2 and a second traction element 3.

Figures 3, 4, 5:
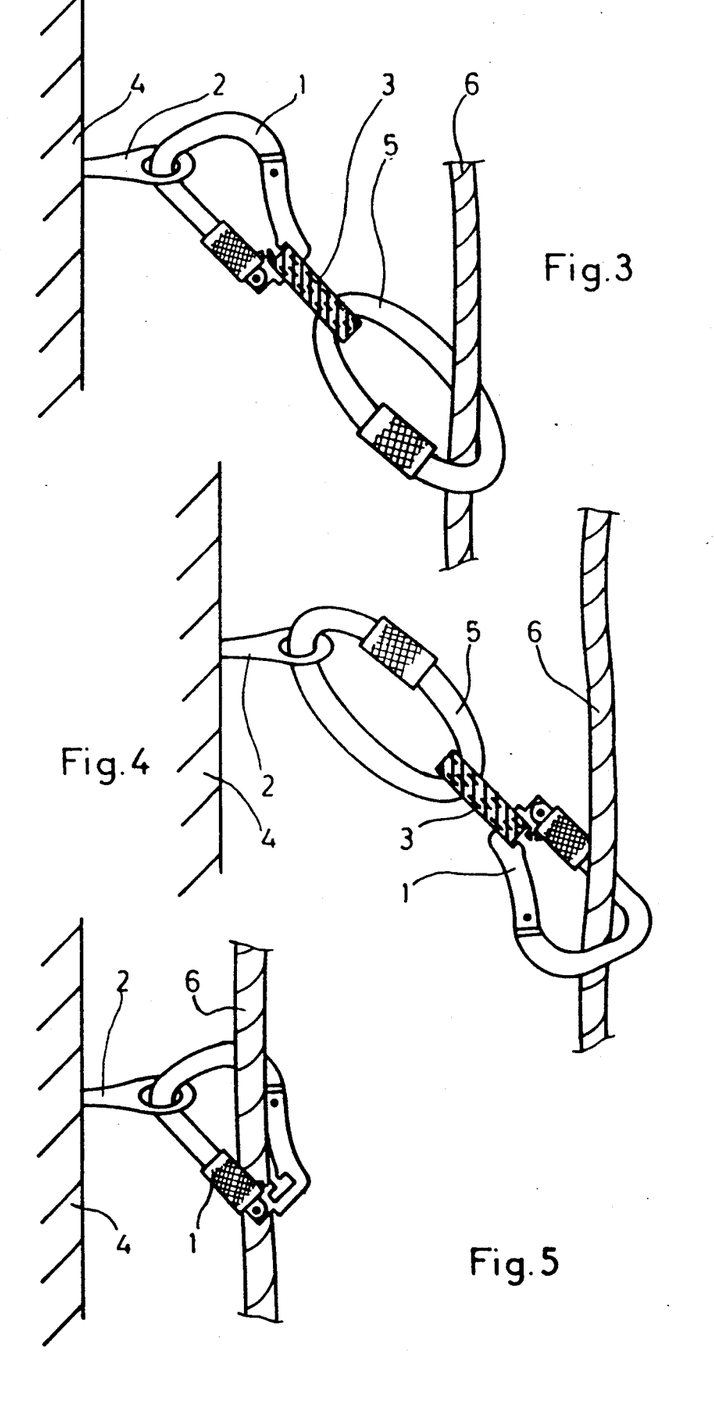
FIGS. 3 to 5 illustrate three methods of using a snap-hook according to the present invention.

A first example of use is shown in FIG. 3. The snap-hook 1 provides the connection between a piton 2 anchored in a rock 4 and a traction element 3 formed of a strap connecting together the snap-hook 1 and an auxiliary snap-hook 5 in which a rope 6 slides. The assembly formed by snap-hook 1, the traction element 3 and the auxiliary snap-hook 5 is normally actuated in the following way: the rope 6 is first of all fitted in the auxiliary snap-hook 5 which may be a conventional locking snap-hook. The user may then secure the assembly to the traction element 2 by opening snap-hook 1 and introducing a portion of snap-hook 1 in an appropriate aperture provided in the traction element 2. To remove the assembly, it is sufficient to open snap-hook 1 and to remove it from the aperture of the traction element 2.

FIG. 4 shows a second possibility of use: the auxiliary snap-hook 5 is then secured to piton 2 and is connected by the second traction element 3 to snap-hook 1 of the present invention; the rope 6 passes through snap-hook 1.

FIG. 5 shows a third possibility of use: snap-hook 1 according to the present invention provides a direct connection between piton 2 and rope 6.

Figure 1:
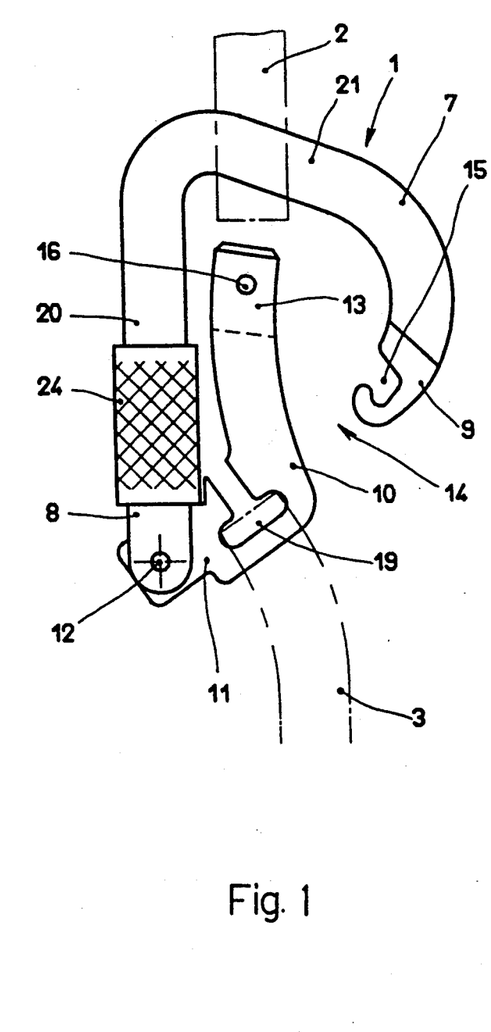
FIG. 1 is a side view of a snap-hook according to the present invention in the open position.
Figure 2:
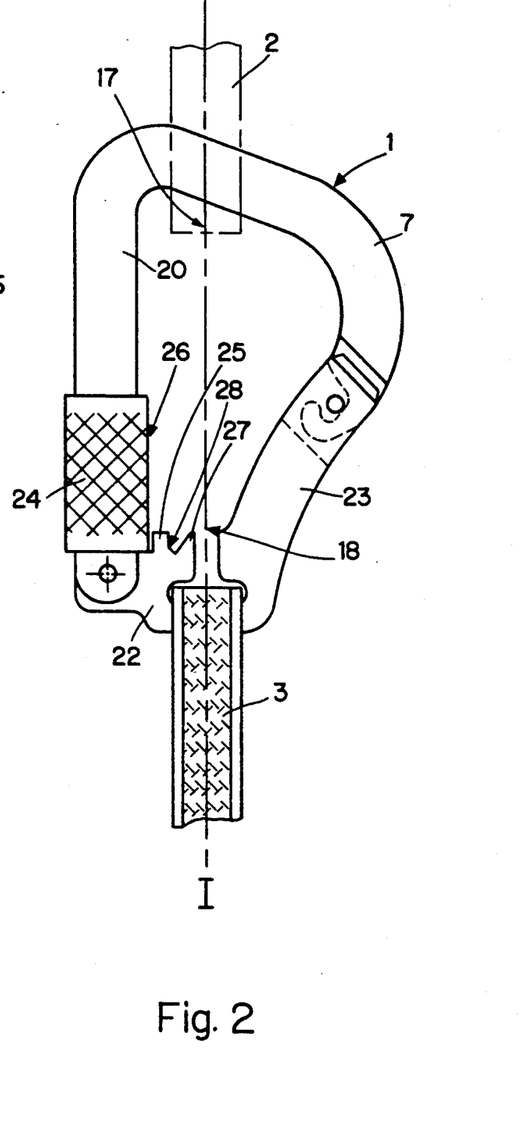
FIG. 2 is a side view of a snap-hook according to the present invention in the closed position.

In the embodiment shown in FIGS. 1 and 2, the snap-hook according to the present invention comprises a body 7 in the form of a rod curved between a first pivot end 8 and a second free coupling end 9. A closure finger 10 is pivoted by its first end 11 to the first pivot end 8 of the body, by a transverse pin 12 substantially perpendicular to the plane of the ring, and its second end 13 comes opposite the second free coupling end 9 of the body. Finger 10 may be pivoted about its pivot pin 12 between an open position, shown in FIG. 1, in which its second end is spaced away from the second free coupling end 9 of the body towards the inside of the ring, leaving a free passage 14 for introducing the traction element 2, and a closed position, shown in FIG. 2, in which its second end 13 comes into contact with the second free coupling end 9 of the body so as to form a closed ring. The finger is returned to its closed position by resilient return means, for example conventional means usually used in known snap-hooks.

The second end 13 of the finger and the second free coupling end 9 of the body comprise interlocking shapes which fit into each other so that, in the closed position, the interlocking shapes prevent the finger 10 from pivoting outwards of the ring and prevent the second respective ends 9 and 13 of the body and of the finger from moving relatively axially away from each other. For example, in the embodiment shown in the figures, the second free coupling end 9 comprises an inner notch 15 into which is inserted a transverse pin 16 of the finger connecting together two lateral flanges between which the second free coupling end 9 is inserted in the closed position. Alternately, notch 15 may be provided on the finger whereas pin 16 is provided on the body. Or else, interlocking one-piece shapes may be provided.

Contrary to traditional snap-hooks, in which the traction elements 2 and 3 are normally applied on the snap-hook body, the finger having substantially only an opening and closing function, the snap-hook according to the present invention is formed so that the tractive load transmitted by the first traction element 2 is applied to the snap-hook body 7 whereas the tractive load transmitted by the second traction element 3 is applied to finger 10. The tractive force between the first element 2 and the second element 3 is thus directed in a general direction I—I passing through the plane of the ring between the pivoting zone and the coupling zone of the finger and of the body. The pivoting zone is formed by pin 12 and the pivot ends 8 and 11, whereas the coupling zone is formed by the two ends 9 and 13 of the body and of the finger.

The result is that the application of a tractive load tends systematically to bring the body and the finger back into their respective closed positions shown in FIG. 2.

The snap-hook according to the present invention comprises, for that, means for guiding the loads so that the tractive load is applied systematically in well defined positions on the snap-hook.

In the embodiments shown, guiding of the load is provided by the fact that the snap-hook has a general form of a ring elongate in the favored traction direction I—I passing through two opposite tractive force application ends 17 and 18. The snap-hook body 7 comprises the first tractive force application end 17. The snap-hook finger 10 comprises the second tractive force application end 18. Thus, at the time of the application of a tractive force between the first traction element 2 and the second traction element 3, the snap-hook tends naturally to be oriented so that its largest dimension is substantially parallel to the direction of the tractive force I—I, the first traction element 2 being hooked on the snap-hook body 7 at the first tractive force application end 17, the second traction element 3 being hooked on the snap-hook finger at the second tractive force application end 18.

An aperture or notch 19 is advantageously formed in the finger 10 in an intermediate position on the finger, and is shaped so that the second traction element 3 passes therethrough, for example a second traction element 3 in the form of a strap, rope, cable or even a snap-hook. The aperture or notch 19 thus promotes the appropriate positioning of the point of application of the tractive force of the second traction element 3 on snap-hook 1. It must however be emphasized that the positioning of the point of application of this tractive force may be provided by the overall geometric shape of the snap-hook. By thus fixing the point of application of the tractive force of the second traction element 3, the point of application of the tractive force of the first traction element 2 is automatically located in an opposite position on the snap-hook body 7.

To facilitate use, and particularly insertion of the second traction element 3 in aperture 19, said aperture may advantageously be a T shaped notch, such as shown, whose central leg opens inwardly of the snap-hook and whose transverse leg is substantially perpendicular to the direction I—I of the force.

The snap-hook body 7 comprises, from its first pivot end 8, a longitudinal generally rectilinear portion 20, a tractive force application end 17 highly curved through an angle greater than 90°, a generally oblique transverse portion 21 itself curved as far as the second coupling end 9. Finger 10 itself comprises, from its first pivot end 11, a first transverse portion 22 followed by an oblique portion 23 and ending in the second end 13. Preferably, the oblique finger portion 23 is curved with its concavity turned outwardly, as shown in the figures.

Preferably, the aperture or notch 19 is closer to the pivot end 11 of the finger than its free coupling end 13.

With such a structure, the tractive forces are mainly withstood by the longitudinal portion 20 of body 7, by the rotation pin 12 and the transverse finger portion 22. Thus, the forces withstood by the coupling zone of the snap-hook, formed by the body and finger ends 9 and 13, are lightened.

In an advantageous embodiment, shown in FIGS. 1 and 2, the snap-hook further comprises a locking ring 24, mounted for sliding on a rectilinear portion of the snap-hook 1 and recalled by a spring towards a locked position in which it immobilizes two respective body and finger ends, with respect to each other, in the closed position, so as to prevent the finger 10 from pivoting towards its open position. Alternately, a screw ring or a quarter turn ring may also be used.

In the variant shown, ring 24 is mounted for sliding on the body portion 7 adjacent its pivot end 8. Finger 10 comprises, in the vicinity of its pivot end 11, a first spur 25 bearing on the external lateral surface 26 of ring 24 when the latter is in the locked position, with the finger closed, as shown in FIG. 2. Spur 25 and ring 24 then prevent finger 10 from opening. By moving ring 24 away from the pivoting zone, the spur 25 may then move towards the longitudinal portion 20 of body 7 and allow finger 10 to pivot.

In the embodiment shown, the second spur 25 further provides locking when open: spur 25 comes to bear on the lateral inner surface of ring 24 when the latter is in the locked position with finger 10 open. The first spur 25 then prevents closure of finger 10. Preferably, the first spur 25 has a bearing face 28 which is in an oblique position when the finger is open, so that, under the application of a tractive force between the first traction element 2 and the second traction element 3, the tractive force tends to cause the finger to pivot towards its closed position, which causes the ring to move axially and bear against the oblique bearing face 28 of the spur, against the ring return spring and away from the pivoting zone. The ring then releases the finger which pivots to its closed position, ring 24 then being returned to its locked position so as to prevent opening of finger 10.

Preferably, in the closed position, the transverse finger portion 22, adjacent its pivot end, is substantially perpendicular to the longitudinal rectilinear body portion 20. Thus, the efficiency of locking finger 10 by ring 24 in the closed position is improved.

Figure 6:
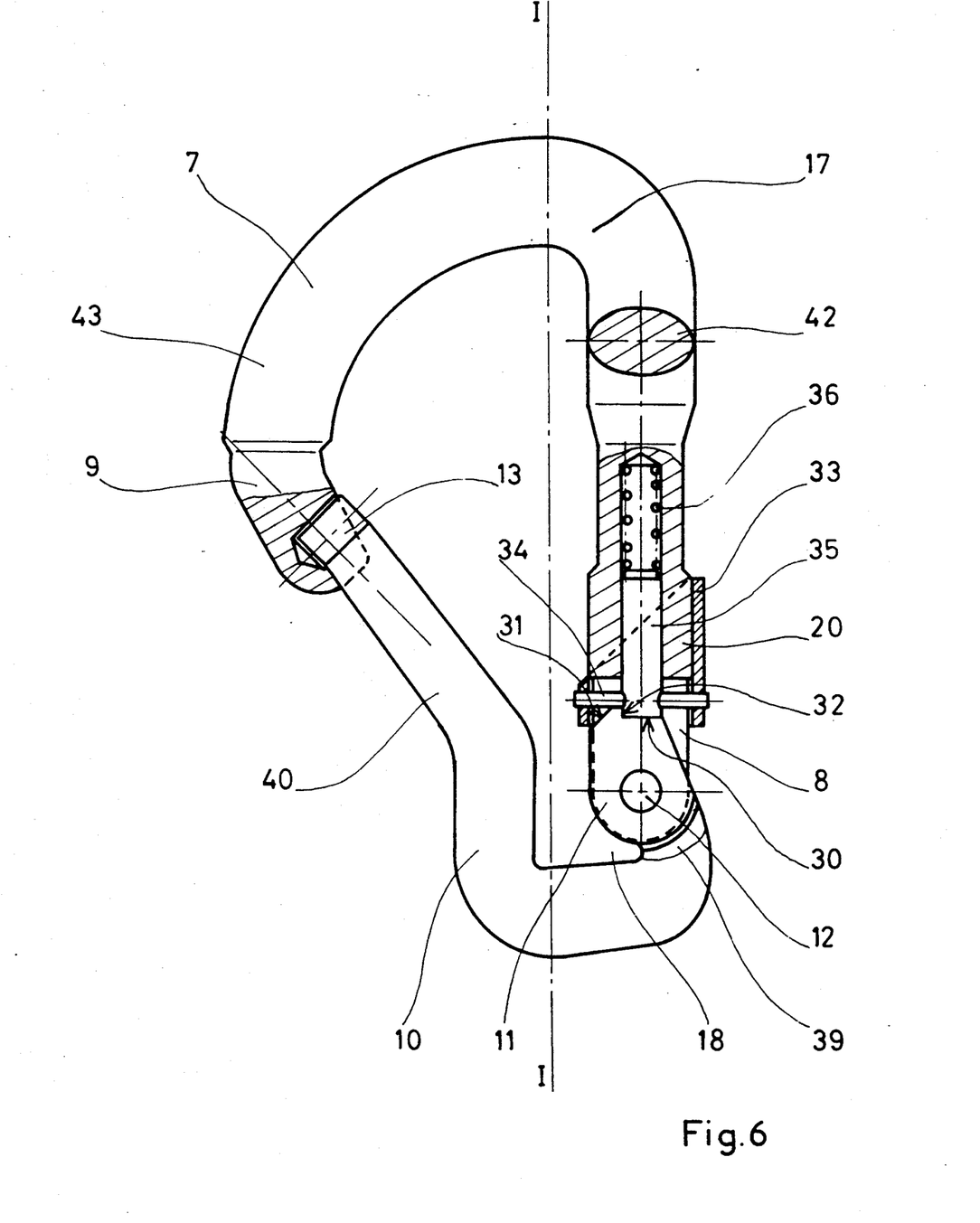
FIG. 6 is a side view of the snap-hook according to a second embodiment of the present invention, in the closed position.

In the embodiment shown in FIG. 6, the snap-hook comprises a body 7 whose shape is similar to that of the embodiment of FIGS. 1 and 2, with a first pivot end 8 and a second free coupling end 9. The closure finger 10 is pivoted by its first end 11 to the first pivot end 8 of the body, by pin 12.

In this embodiment, the pivoted end 11 of finger 10 comprises a facet 30 for holding it in the closed position, a facet 31 for holding it in the open position and a locking facet 32. Facet 30 for holding in the closed position is bordered by the locking facet 32 connecting it to facet 31 for holding it in the open position, as shown in the figure.

A locking ring 33 is locked in axial translation, by a pin 34, with a locking pin 35. The end of the locking pin 35 comes to bear against the pivot end 8 of the snap-hook body so that, in the closed position shown in the figure, the locking pin 35 bears axially against the closed position holding facet 30 and bears laterally against the locking facet 32. The assembly formed by the locking ring 33 and the locking pin 35 is urged by a spring 36 towards the pivot end 11 of finger 10 so that the locking pin 35 is held against facet 30 and cannot escape from the locking facet 32. Thus, in the closed position, the locking pin prevents the finger 10 from pivoting towards its open position. In the open position, the locking pin 35 bears axially against the open position holding facet 31 and does not oppose an appreciable resistance to the return of finger 10 to the closed position.

Figure 7:
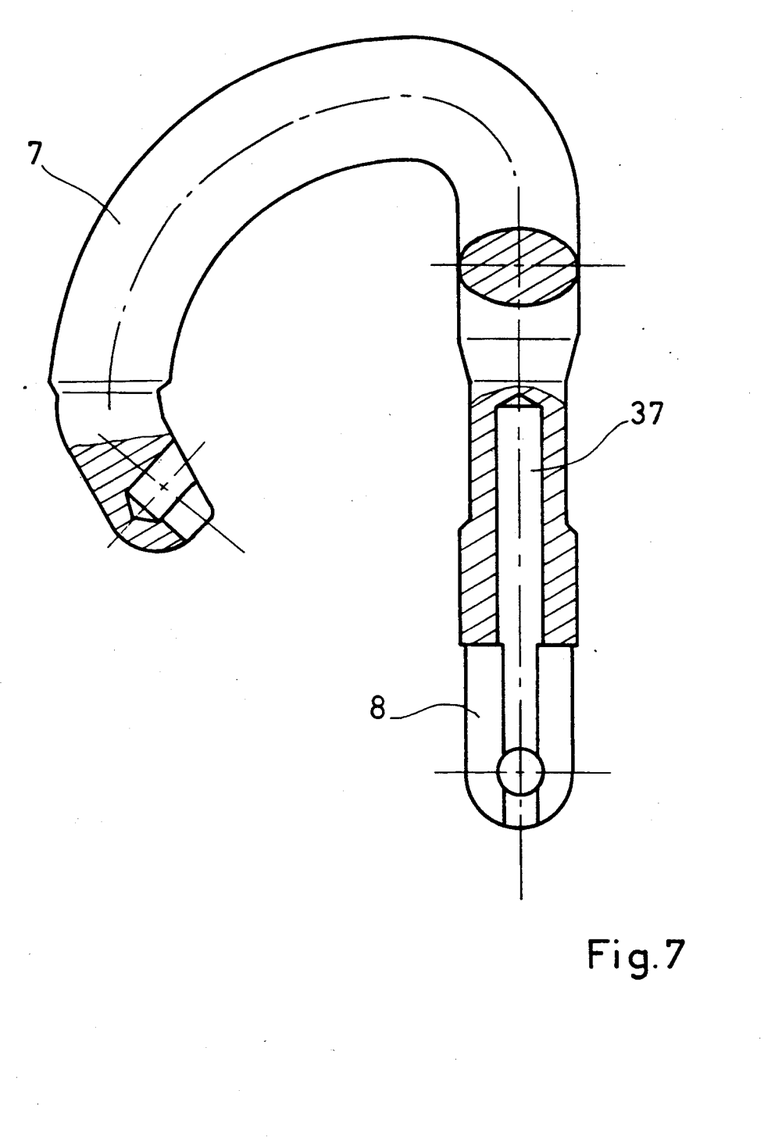
FIG. 7 is a partial cross sectional view of the snap-hook body of the embodiment of FIG. 6.

FIG. 7 shows the constructional detail of the snap-hook body 7 in this embodiment. An axial housing 37 is again provided for containing spring 36 and the locking pin 35. The pivot end 8 of body 7 comprises two lateral webs forming a fork into which the pivot end 11 of the finger is engaged.

Figure 8:
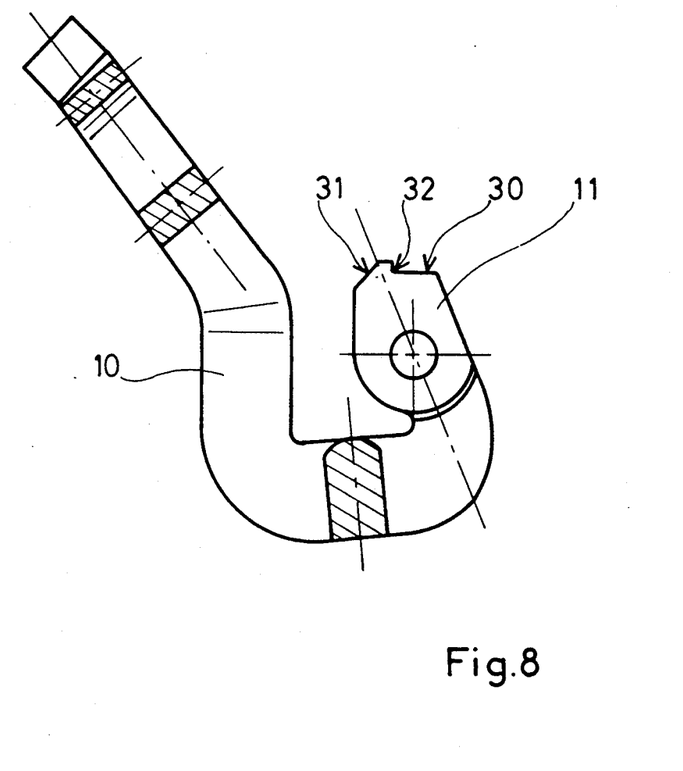
FIG. 8 shows the finger of the snap-hook of FIG. 6.

In FIG. 8, the finger 10 has been shown, with its pivot end portion 11, comprising a passage hole for pin 12 and comprising the closed position holding facet 30, the open position holding facet 31 and the locking facet 32 in the closed position.

Figure 9:
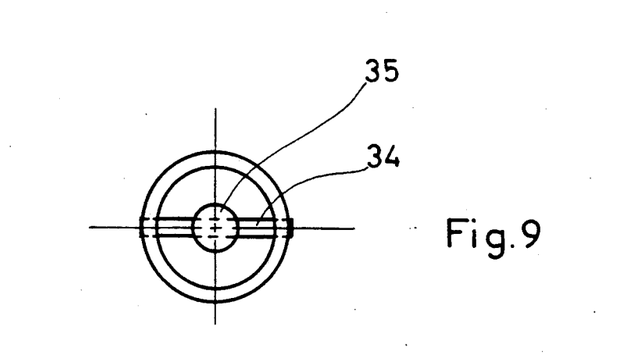
FIG. 9 is an end view of a ring for locking the snap-hook of FIG. 6.
Figure 10:
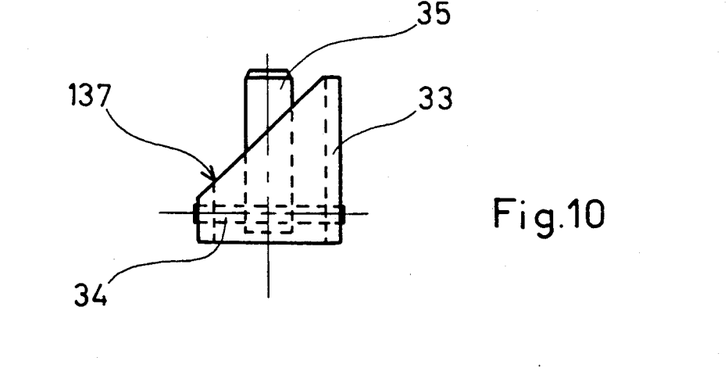
FIG. 10 is a side view of the locking ring of the snap-hook of FIG. 6.

FIGS. 9 and 10 show the locking ring 33, interlocked with the locking pin 35 by the transverse pin 34. The locking ring 33 advantageously comprises an inclined portion 137 oriented inwardly of the snap-hook as shown in FIG. 6 and facilitating opening of the finger.

In this embodiment, finger 10 has a curved shape, with an intermediate portion 18 in the form of a small diameter arc, with flat bottom for passing a strap therethrough, forming the notch or aperture for passage of the second traction element 3. The finger has a first lateral leg 39 of smaller length, comprising the first pivot end 11 and comprises a second lateral leg 40 of greater length including the second coupling end 13. Body 7 also has a curved shape, with an intermediate portion 17 in the shape of a small diameter arc forming a tractive force application end, with a first longitudinal lateral leg 42 of greater length comprising the first pivot end 8 and with a second lateral leg 43 of smaller length comprising the second free coupling end 9.

The favored traction direction I—I passing through the curved part 17 of body 7 and the curved part 18 of finger 10 is located close to the large leg 42 of body 7, thus contributing to the take-up of tractive forces.

Figure 11:
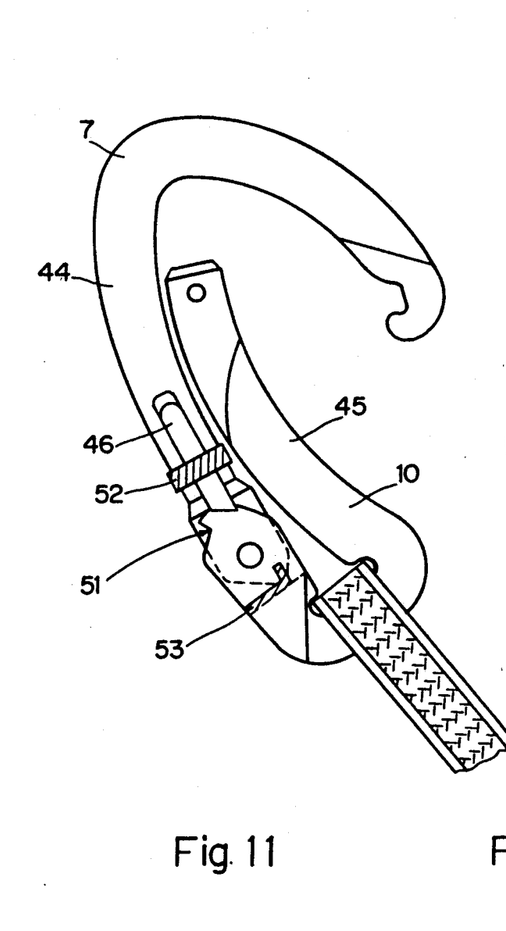
FIG. 11 is a side view of a snap-hook according to a third embodiment of the present invention, in the open position.

In the embodiment of FIGS. 11 to 14, the shapes of body and finger are slightly different. Body 7 has a first slightly curved longitudinal lateral leg 44, with inwardly turned concavity, as shown in FIG. 11. The second lateral leg 45 of the finger is curved slightly outwardly, so as to substantially follow the curvature of the first lateral leg 44 of the body when the snap-hook is in the open position.

In this embodiment, the snap-hook comprises locking means different from those of the preceding embodiment. In this embodiment, the locking means comprise at least one locking lever mounted for pivoting on the snap-hook body about an intermediate transverse axis substantially parallel to the plane of the snap-hook, this locking lever comprising an actuating leg accessible to the user by radial pressure on the snap-hook body, and a locking leg engaging on one of the corresponding parts of the finger.

For example, in FIGS. 11 to 14 the locking lever 46, with a slightly S shaped profile, is held against a flat lateral face 47 of the snap-hook body 7. The central bent part 48 of the locking lever 46 forms a transverse intermediate axis for the pivoting of locking lever 46, parallel to the plane of the snap-hook. The central bent portion 48 connects together an actuating leg 49, accessible by the user by radial pressure on the snap-hook body and a locking leg 50 engaged on corresponding parts of finger 10.

Figures 12, 13:
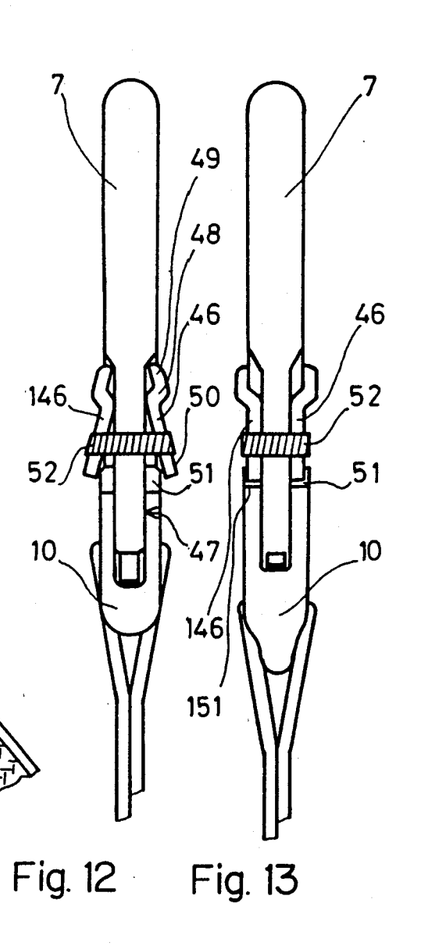
FIG. 12 is a profile view of the snap-hook of FIG. 11, in the locked position.
FIG. 13 is a side view of the snap-hook of FIG. 11, in the unlocked position.
Figure 14:
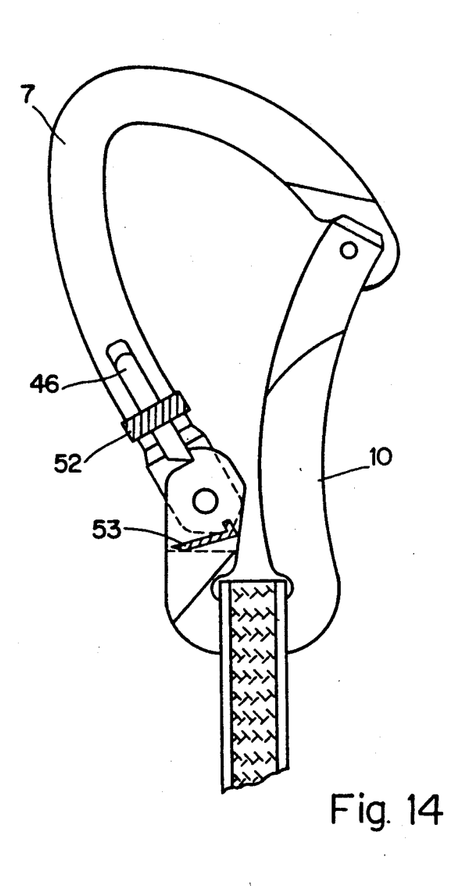
FIG. 14 is a side view of the snap-hook of FIG. 11, in the closed and locked position.

Finger 10 comprises at least one lateral notch 51, better seen in FIG. 11, in which the locking leg 50 of the locking lever may be engaged when the finger is closed, as shown in FIGS. 13 and 14. The locking lever 46 may pivot between a locked position, shown in figure 13, in which the end of locking leg 50 bears against the pivot end of finger 10 and may engage in its lateral notch 51 so as to prevent pivoting thereof, and an unlocked position, shown in FIGS. 12 and 11 in which the locking leg 50 is moved away from finger 10 so that it can pivot.

Resilient means return the locking lever to its locked position.

In the embodiment shown, the snap-hook comprises two identical diametrically opposite locking levers 46 and 146 cooperating with two opposite notches 51 and 151 of the pivot end of finger 10. A resilient ring 52 surrounds the snap-hook body and the locking leg of the locking levers 46 and 146 so as to return said locking levers to their locked position as shown in FIG. 13.

In this embodiment of FIGS. 11 to 14, a return spring 53 has also been shown urging finger 10 in rotation on body 7 towards its open position. Thus, in the absence of a load, the unlocking of the locking means such as 46 and 146 causes automatic opening of the snap-hook. The application of a load causes automatic closure of the snap-hook and engagement of the locking means 46 and 146 then preventing opening of the snap-hook even in the absence of a load, until levers 46 and 146 are subsequently voluntarily operated.

A spring such as spring 53 may also be adapted in the other embodiments described above.

Figure 15:
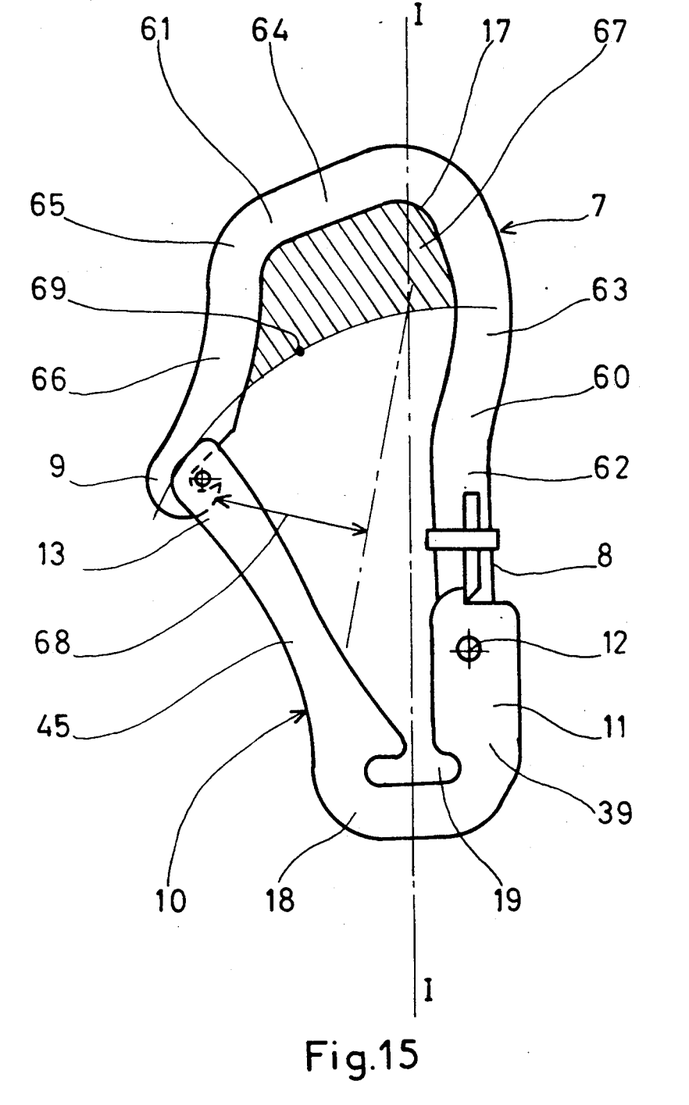
FIG. 15 is a side view of a snap-hook according to a fourth embodiment of the present invention.

FIG. 15 shows, in a side view, a snap-hook embodiment in accordance with the present invention which is particularly advantageous for obtaining both great mechanical strength, wide opening and great ease of use.

The ease of use is obtained, in the preceding embodiments, by the same means contributing to closure and/or opening of the snap-hook.

The wide opening possibilities and the high mechanical resistance to tractive forces are obtained by choosing particular shapes for the finger 10 and body 7.

Thus, in this embodiment, body 7 comprises, from its first pivot end 8, a first longitudinal lateral leg 60 comprising a rectilinear longitudinal portion 62 substantially parallel to the favored traction direction I—I. This longitudinal portion 62 is followed by a rounded portion 63 slightly offset outwardly as shown in the figure, which is itself connected to the tractive force application end 17 which is highly curved through an angle greater than 90°. We then find a substantially rectilinear oblique portion 64 generally parallel to the geometric locus 69 of the positions assumed by the free coupling end 13 of FIG. 10 during pivoting of the finger. This oblique portion 64 is connected by a bend 65 to a slightly curved end segment 66 with outwardly turned concavity.

Finger 10 comprises, from its first pivot end 11, a first lateral leg 39 of smaller length and substantially parallel to the favored traction direction I—I when the finger is in the closed position. We then find the intermediate portion 18 in the form of a small diameter arc, then a second lateral leg 45 of greater length with slightly outwardly turned concavity and comprising the second coupling end 13 of the finger.

With these forms such as shown in FIG. 15, the pivoting of finger 10 leaves a particularly large inner space 67 available for the introduction of at least four rope strands. Furthermore, when the finger is in the open position, with its coupling end 13 bearing against the rounded portion 63 of the body, there remains a particularly wide opening 68 for introducing rope strands or other objects to which the snap-hook is to be fastened. Thus, dynamic snap-hook fixing is considerably facilitated.

Figure 16:
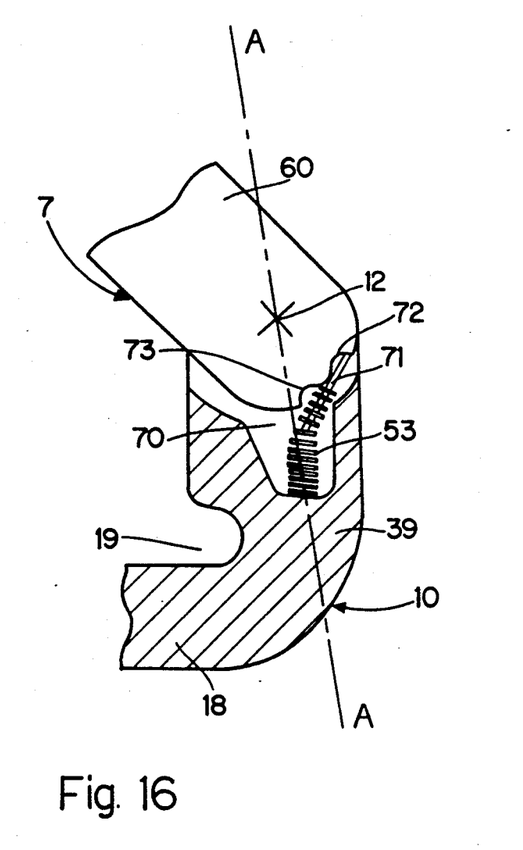
FIG. 16 is a detail view in partial cross section of the pivoting zone of a snap-hook according to the present invention in the open position.
Figure 17:
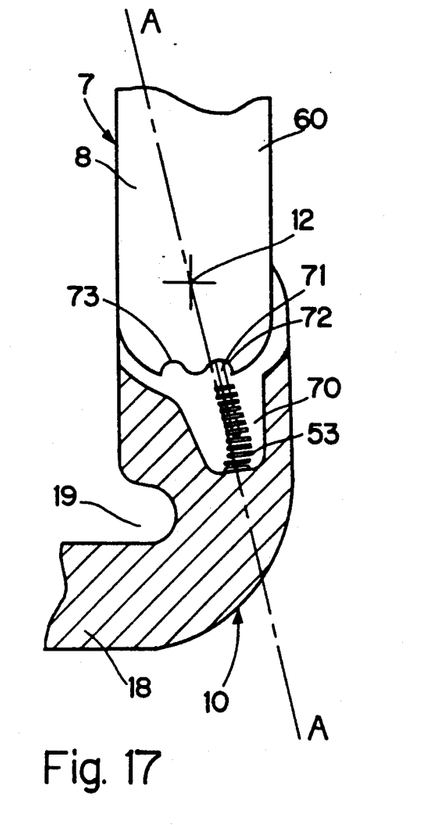
FIG. 17 is a similar view in the closed position.
Figure 18:
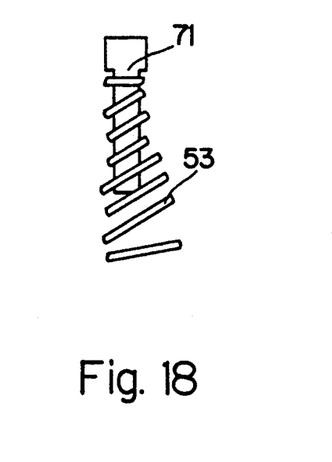
FIG. 18 illustrates the return spring associated with a tongue.

FIGS. 16 to 18 show a particular embodiment of the resilient return means urging finger 10 in rotation on the body, in particular towards its open position.

In the embodiment shown, finger 10 comprises, at its pivot end 11, an axial housing 70 open in the pivoting zone and shaped so as to contain the return spring 53.

The return spring 53 is a helical compression spring extended by an axial tongue 71.

Body 10 comprises, at its pivot end 8, a first catch 72 and a second catch 73 offset with respect to each other.

The return spring 53 bears axially in the bottom of the axial housing 70, whereas tongue 71 bears axially in one of the catches 72 or 73. In FIGS. 16 and 17, the tongue bears in the first catch 72. This first catch 72 is positioned so that the return spring 53 and tongue 71 tend to return the finger 10 permanently towards its open position. Thus, an embodiment is provided in which the opening of the snap-hook is assisted, and occurs as soon as the locking means are actuated for unlocking them.

However, by housing the tongue 71 in the second catch 73, a snap-hook can be produced in which spring 53 has a slightly different action: in this case, the second catch 73 is positioned so that the return spring 53 and tongue 71 tend to return finger 10 now towards its closed position, now towards its open position, on each side of an intermediate zero return torque position. For that, during rotation of finger 10, the second catch 73 must pass alternately on each side of the line A-A joining the base of spring 53 to the pivot pin 12. In this case, the finger may remain in the open position, where it is held by the spring; by voluntarily pivoting the finger, the intermediate zero return torque position is overshot and the finger is then urged by the spring towards its closed position, and conversely.

The present invention is not limited to the embodiments which have been explicitly described, but includes the different variants and generalizations thereof contained in the scope of the following claims. It is for example possible to design a snap-hook without locking ring but with means for resiliently returning the finger to the closed position; or a snap-hook with locking ring but without means for resiliently returning the finger.

What is claimed is:

1. A snap-hook having the general shape of a closed ring, the ring defining an opening in a plane, the snap-hook transmitting a tractive load between a first traction element and a second traction element passing through the opening of the ring, the snap-hook comprising:

a body in the form of a rod curved between a first pivot end and a second free coupling end;

a closure finger, whose first end is pivoted on the first pivot end of the body, in a pivoting zone, by a transverse pin, and whose second end comes opposite the second free coupling end of the body in a coupling zone;

wherein the finger may be pivoted about its pivot pin between an open position, in which its second end is spaced away from the second free coupling end of the body towards the inside of the ring, and a closed position in which its second end is in contact with the second free coupling end of the body so as to form a closed ring;

wherein the second end of the finger and the second free coupling end of the body comprise interlocking shapes fitting one into the other so that, in the closed position, the interlocking shapes prevent the finger from pivoting outwards of the ring and prevent the second respective ends of the finger and of the body from moving relatively axially away from each other;

wherein the snap-hook comprises load guidance means so that the tractive load transmitted by the first traction element is applied on an intermediate zone of the body whereas the tractive load transmitted by the second traction element is applied to an intermediate zone of the finger, the tractive force between the first traction element and the second traction element thus taking place in a favored traction direction passing through the plane of the ring between the pivoting zone and the coupling zone of the finger and the body, so that application of the tractive load tends to bring the body and the finger back into their respective closed positions;

wherein the snap-hook has the general shape of a ring elongate in a favored traction direction passing through two opposite ends, said opposite ends forming first and second tractive force application ends;

wherein the body comprises said first tractive force application end;

wherein the closure finger comprises said second tractive force application end, so that, during application of a tractive force between a first traction element and a second traction element, the snap-hook tends naturally to be oriented so that its largest dimension is substantially parallel to the direction of the tractive force, the first traction element being hooked on to the body and the second traction element being hooked on to the finger;

wherein the snap-hook comprises unlockable locking means for selectively immobilizing the finger on the body in the closed position of the snap-hook, and then preventing the finger from pivoting towards its open position;

wherein said unlockable locking means comprises a locking ring mounted on a rectilinear portion of the snap-hook and returned by a spring towards its locked position in which it immobilizes two respective body and finger ends, with respect to each other, in the closed position, so as to prevent the finger from pivoting towards its open position;

wherein the locking ring is mounted on a body portion adjacent its pivot end.

2. The snap-hook as claimed in claim 1, wherein the finger comprises, in the vicinity of its pivot end, a first spur bearing on the external lateral surface of the locking ring when the latter is in the locked position with the finger closed, preventing opening of the finger.

3. The snap-hook as claimed in claim 2, wherein the first spur bears on the inner lateral surface of the locking ring when the latter is in the locked position with the finger open, thus opposing closure of the finger.

4. The snap-hook as claimed in claim 3, wherein the first spur comprises an oblique bearing face so that, under the application of a tractive force between the first traction element and the second traction element, the tractive force tends to cause the finger to pivot towards its closed position, which causes axial movement of the locking ring, bearing against the oblique bearing face, against the ring return spring, and the locking ring releases the finger which pivots to its closed position, the locking ring then being returned to the locked position by its spring to prevent opening of the finger.

5. The snap-hook as claimed in claim 1, wherein:
the tractive force application ends are positioned on the snap-hook so that the favored traction direction is closer to the pivot end of the finger than its free coupling end,
the body comprises, from its first pivot end, a longitudinal portion which is generally hardly curved and is parallel to the favored traction direction, a tractive force application end which is highly curved through an angle greater than 90°, and a generally oblique transverse portion itself curved as far as the second coupling end.

6. A snap-hook having the general shape of a closed ring, the ring defining an opening in a plane, the snap-hook transmitting a tractive load between a first traction element and a second traction element passing through the opening of the ring, the snap-hook comprising:
a body in the form of a rod curved between a first pivot end and a second free coupling end;
a closure finger, whose first end is pivoted on the first pivot end of the body, in a pivoting zone, by a transverse pin, and whose second end comes opposite the second free coupling end of the body in a coupling zone;
wherein the finger may be pivoted about its pivot pin between an open position, in which its second end is spaced away from the second free coupling end of the body towards the inside of the ring, and a closed position in which its second end is in contact with the second free coupling end of the body so as to form a closed ring;
wherein the second end of the finger and the second free coupling end of the body comprises interlocking shapes fitting one into the other so that, in the closed position, the interlocking shapes prevent the finger from pivoting outwards of the ring and prevent the second respective ends of the finger and of the body from moving relatively axially away from each other;
wherein the snap-hook comprises load guidance means so that the tractive load transmitted by the first traction element is applied on an intermediate zone of the body whereas the tractive load transmitted by the second traction element is applied to an intermediate zone of the finger, the tractive force between the first traction element and the second traction element thus taking place in a favored traction direction passing through the plane of the ring between the pivoting zone and the coupling zone of the finger and the body, so that application of the tractive load tends to bring the body and the finger back into their respective closed positions;
wherein the snap-hook has the general shape of a ring elongate in a favored traction direction passing through two opposite ends, said opposite ends forming first and second tractive force application ends;
wherein the body comprises said first tractive force application end;
wherein the closure finger comprises said second tractive force application end, so that, during application of a tractive force between a first traction element and a second traction element, the snap-hook tends naturally to be oriented so that its largest dimension is substantially parallel to the direction of the tractive force, the first traction element being hooked on to the body and the second traction element being hooked on to the finger;
wherein the snap-hook comprises unlockable locking means for selectively immobilizing the finger on the body in the closed position of the snap-hook, and then preventing the finger from pivoting towards its open position;
wherein the snap-hook comprises a return spring urging the finger in rotation on the body towards its open position, so that, in the absence of a load, unlocking of the locking means causes automatic opening of the snap-hook.

7. A snap-hook having the general shape of a closed ring, the ring defining an opening in a plane, the snap-hook transmitting a tractive load between a first traction element and a second traction element passing through the opening of the ring, the snap-hook comprising:
a body in the form of a rod curved between a first pivot end and a second free coupling end;
a closure finger, whose first end is pivoted on the first pivot end of the body, in a pivoting zone, by a transverse pin, and whose second end comes opposite the second free coupling end of the body in a coupling zone;
wherein the finger may be pivoted about its pivot pin between an open position, in which its second end is spaced away from the second free coupling end of the body towards the inside of the ring, and a closed position in which its second end is in contact with the second free coupling end of the body so as to form a closed ring;
wherein the second end of the finger and the second free coupling end of the body comprise interlocking shapes fitting one into the other so that, in the closed position, the interlocking shapes prevent the finger from pivoting outwards of the ring and prevent the second respective ends of the finger and of the body from moving relatively axially away from each other;
wherein the snap-hook comprises load guidance means so that the tractive load transmitted by the first traction element is applied on an intermediate zone of the body whereas the tractive load transmitted by the second traction element is applied to an intermediate zone of the finger, the tractive force between the first traction element and the second traction element thus taking place in a favored traction direction passing through the plane of the ring between the pivoting zone and the coupling zone of the finger and the body, so that application of the tractive load tends to bring the body and the finger back into their respective closed positions;

wherein the snap-hook has the general shape of a ring elongate in a favored traction direction passing through two opposite ends, said opposite ends forming first and second tractive force application ends;

wherein the body comprises said first tractive force application end;

wherein the closure finger comprises said second tractive force application end, so that, during application of a tractive force between a first traction element and a second traction element, the snap-hook tends naturally to be oriented so that its largest dimension is substantially parallel to the direction of the tractive force, the first traction element being hooked on to the body and the second traction element being hooked on to the finger;

wherein the snap-hook comprises unlockable locking means for selectively immobilizing the finger on the body in the closed position of the snap-hook, and then preventing the finger from pivoting towards its open position;

wherein the finger comprises, at its pivot end, an axial housing open in the pivoting zone, the housing having a bottom, the housing being shaped so as to contain a return spring;

wherein the return spring is a helical compression spring extended by an axial tongue;

wherein the body comprises, on its pivot end, a first catch and a second catch offset with respect to each other;

wherein the return spring bears axially in the bottom of the axial housing, whereas the tongue bears axially in one of the catches;

wherein the first catch is positioned so that the return spring and the tongue tend to return the finger permanently to its open position;

wherein the second catch is positioned so that the return spring and the tongue tend to return the finger now towards its closed position, now towards it open position, on each side of an intermediate zero return torque position.

* * * * *